Dec. 6, 1955  H. E. NUNN, JR  2,726,099
BALL AND SOCKET HITCH WITH AUTOMATIC SAFETY LATCH
Filed March 3, 1955  2 Sheets-Sheet 1
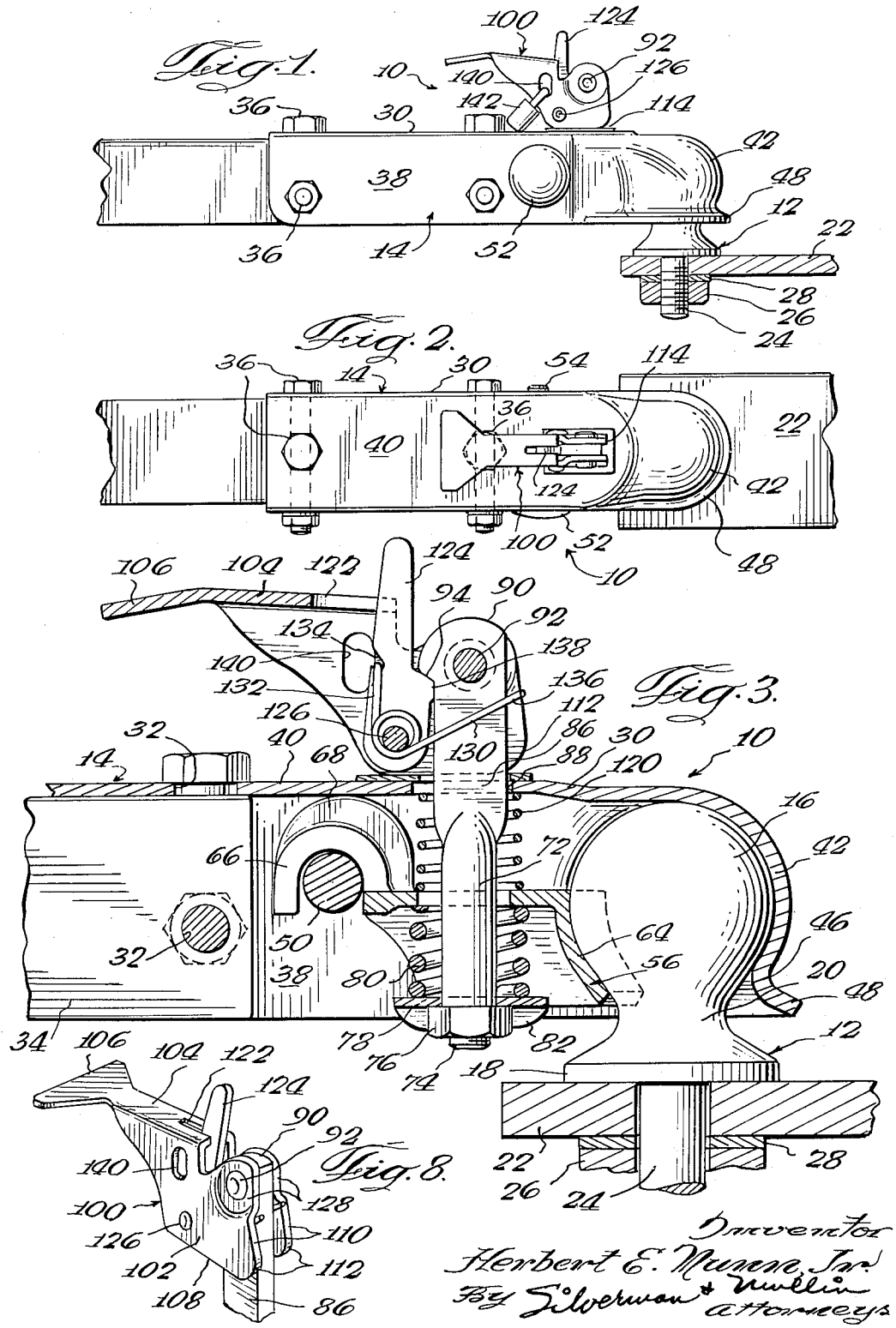

Dec. 6, 1955  H. E. NUNN, JR  2,726,099
BALL AND SOCKET HITCH WITH AUTOMATIC SAFETY LATCH
Filed March 3, 1955  2 Sheets-Sheet 2
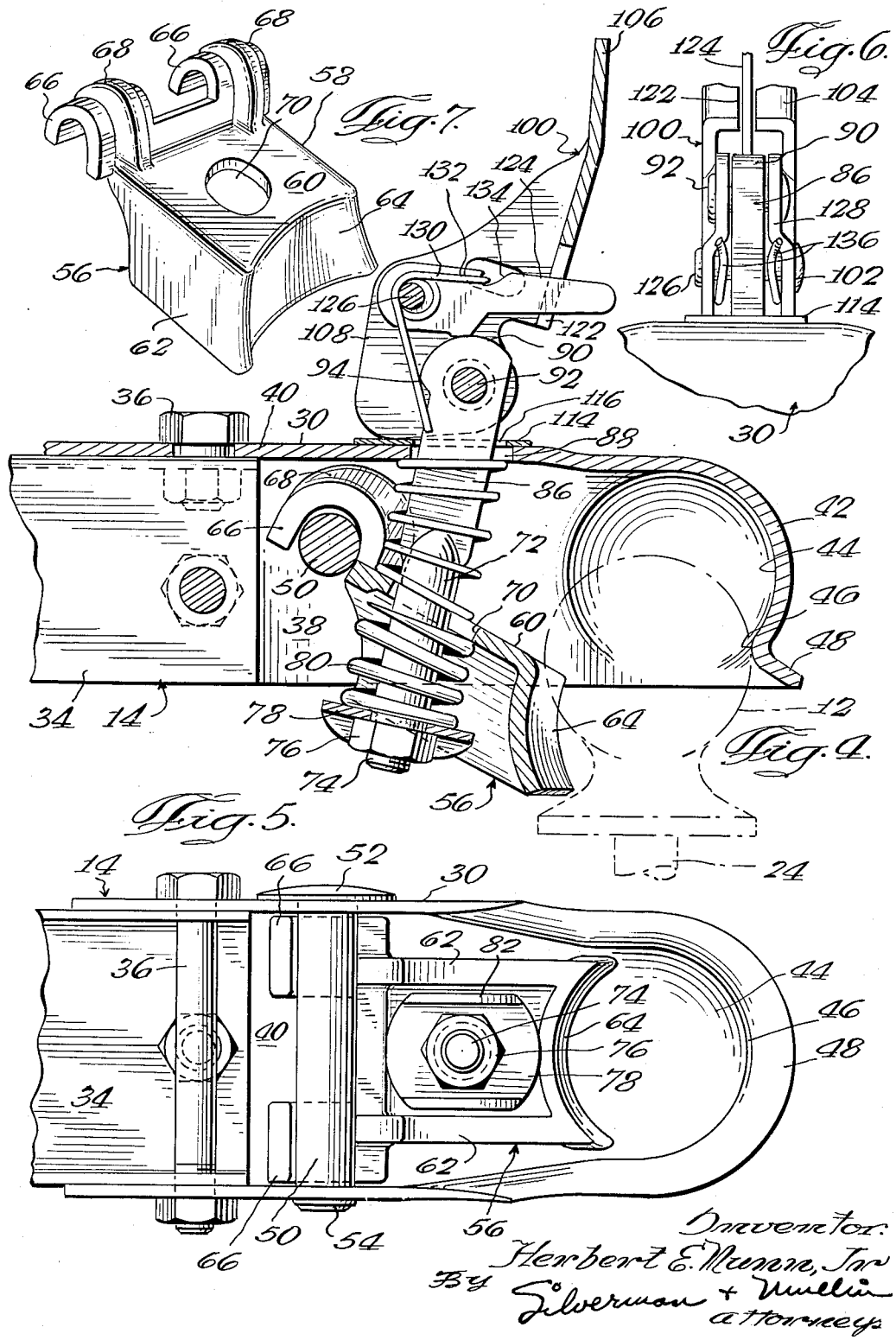

United States Patent Office

2,726,099
Patented Dec. 6, 1955

2,726,099

BALL AND SOCKET HITCH WITH AUTOMATIC SAFETY LATCH

Herbert E. Nunn, Jr., Winnetka, Ill., assignor to H. W. Crane Co., Maywood, Ill., a corporation of Illinois Application March 3, 1955, Serial No. 491,850

5 Claims. (Cl. 280—512)

This invention relates generally to trailer couplings and more particularly is concerned with a so-called automatic trailer coupling which is adapted to provide a quick acting and positive locking articulated connection between a trailer and a towing vehicle.

The usual coupling between towing and towed vehicles of moderate size, for example passenger car weight, has heretofore been provided by various types of connections whose conjunction is affected by friction maintained by screw-threaded means. It is not uncommon for such couplings to become separated during transit and likewise, additional safety connections by way of chains and tension cables may be provided to take care of such contingency. Couplings of the prior art, where constructed to provide positive connection are difficult to install and remove. Use of such couplings by individuals where a hitch is made up and often retained in coupled relationship for long periods of time, is not wholly objectionable because of the time and tools needed. For short use, as for example, where a trailer may be used several times on the same or different vehicles, such couplings are wasteful of time.

Even the most simple of couplings requires a hand wheel to be screwed home for securement and to be unscrewed for removal.

The invention herein is characterized principally by the provision of a coupling which is adapted for use with a ball type of connector to establish substantially universal engagement, the coupling capable of being engaged over a ball connector, and snapped to closed and locked condition on one pressing movement. The invention is further characterized in the provision of this type of coupling in which, when it is desired to separate the parts of the coupling, the operator pulls back a safety latch and lifts a locking lever, both of these latter functions being readily accomplished by one hand and in substantially one movement.

The principal objects of the invention are the provision of a coupling as characterized above.

A further object of the invention is the provision of a coupling in which the connection resulting from the interconnection between the coupling and a ball connector, although locked against separation, is one which readily moves universally while providing a resilient and shock absorbing connection.

Still another object of the invention is the provision of a coupling in which the parts are simple in configuration and easily manufactured, and in which the elements of the coupling are easily assembled or disassembled.

Another object of the invention is the provision of a quick-acting and positive locking coupling in which the same may be locked against unauthorized separation of the parts thereof by the simple expedient of blocking the safety latch, for example by a padlock.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawing a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a side elevational view of a coupling constructed in accordance with the invention and installed between a trailer and a towing vehicle, the coupling being locked against unauthorized removal by a padlock.

Fig. 2 is a top plan view of the coupling of Fig. 1, the padlock not being shown in this or any of the following views.

Fig. 3 is an enlarged median sectional view through the coupling showing the same in connected condition.

Fig. 4 is a view similar to that of Fig. 3 but showing the coupling in separated, that is, unlocked condition, as for receiving a ball connector therein or removing such a connector therefrom.

Fig. 5 is a bottom plan view on an enlarged scale of the coupling, the ball connector not being illustrated, although the parts are in their normal towing position.

Fig. 6 is a front-on elevational view of the upper portion of the coupling showing the locking lever and automatic safety latch mounted thereon.

Fig. 7 is a perspective view of the ball-retaining shoe of the coupling.

Fig. 8 is a perspective view of the latch and locking lever in locked and towing condition.

Prior to commencing the description of the preferred embodiment it is desired to define the usage of certain words, for uniformity and clarity throughout.

The basic connection between the two vehicles, that is, the towed and towing vehicles, is a ball and socket joint. The parts thereof are thus two in number, namely a ball connector and a socket connector. The designation "ball connector" or "ball" will signify the ball portion of the connection, which is usually secured to the towing vehicle. For the sake of simplicity, but without intending limitation, the towing vehicle hereinafter will be referred to as a "tractor," and it will be obvious that same can be a truck, tractor (as commonly understood), automobile, or the like. The towed vehicle will be designated "trailer."

The designation "socket connector" will be used as a general descriptive appellation for the second part of the connection, which is usually secured to the trailer. The tractor is in most cases much heavier than the trailer and the ball connector is secured thereto. The trailer will usually have a tongue or extension of its framework carrying the socket connector and this portion is pivotal vertically to enable the connection to be established. A great many trailers will be simple two-wheeled wagons, easily tilted to enable the downwardly opening socket connector to be engaged over the ball of the ball connector.

Since it is conceivable that the invention is applicable to connectors in which the mating parts are of other than ball and socket configuration, such an conical, or cup-shaped, the generic designations "male" and "female" connectors will be used in the claims to designate respectively the ball and socket portions of the connection.

The word "coupling" when used as a noun herein, designates the two parts of the connection, that is, the ball connector and the socket connector. The word "coupler" will designate only one of the parts of the connection, and hence in that respect, will be synonymous with the word "connector" used in conjunction with any of the words "ball," "socket," "male" and "female."

As will be apparent by this time, the invention comprises basically a ball and socket joint. The socket portion of the joint is provided on the interior thereof with a shoe which, in cooperation with the front wall of the female connector, forms a spherical seat for the ball portion of the male connector. The shoe is pivotal vertically between a position leaving sufficient room between itself and the front wall of the socket connector to permit passage of the ball and a position up inside the socket connector locking the ball in place. The pivoting of the shoe is accomplished through the medium of a vertical connecting rod or link which protrudes from the top of the socket connector and is reciprocated vertically by means of a lever actuated cam. A spring pressed latch provides automatic locking of the cam in position holding the shoe up inside the socket connector securing the ball in place.

One spring urges the connecting rod or link downward, tending to force the shoe to pivot out of the bottom of the socket connector to release the ball, and another spring of heavy construction is compressed when the shoe is in place so that the resulting ball and socket connection is a resilent one. This will be brought out by the explanation.

Coming now to the specific details of the structure, in Fig. 1 there is illustrated a coupling 10 embodying the invention and formed of a ball connector 12 and a socket connector 14 matingly engaged and locked together to provide for limited universal movement between a tractor and trailer. The ball connector 12 is more or less conventional in construction and has an upwardly protruding almost spherical ball part 16 connected to a conical shoulder 18 by a narrow neck 20. The shoulder engages upon a suitable part of the tractor, such as for example, a protruding plate or draw-bar, termed in the art a "hitch" and illustrated herein at 22 merely as a simple plate. A stud 24 fixed in the bottom of the ball connector 12 extends through a suitable opening in the hitch 22 and is engaged by a nut 26. Any locking means assures tight mounting, as for example lock washer 28.

The socket connector 14 is the principal part of the coupling 10 and provides the novelty of the invention herein. The connector 14 is formed of an elongate formation which may conveniently be termed a shell 30, provided at suitable places with holes 32 so that the same may be mounted upon the tongue or drawbar 34 of the trailer. Conveniently, the body of the shell 30 is channel shaped in cross section and thereby may matingly engage with a drawbar 34 of similar configuration and be bolted by the bolts such as shown at 36 passing through the holes 32. Any desired method of securement is feasible, even welding, for example.

As stated, the body of the shell 30 is of channel-shaped cross section giving rise to side walls 38 and a top wall 40. The cross sectional formation is uniform throughout substantially the entire length of the shell 30, but the front end thereof, that is, the right hand end as seen in the drawings, is formed to house the ball portion 16 of the ball connector 12. It is therefore provided with a rounded end portion 42 the interior surface 44 of which is spherical to mate with the face of the ball portion 16. The surface 44 is shallower than the ball portion 16, to give some freedom to the movement of the ball connector 12 relative to the socket connector 14. Thus, the surface 44 follows the surface of the ball portion 16 not quite as far as the neck 20 (see Fig. 3) and breaks away at 46 to flare outward. This results in the formation of an integral semicircular skirt 48 at the bottom of the rounded end portion 42 which provides several functions. It protects the interior of the coupling from flying saind, gravel, and moisture, and it also serves as a guide for aiding the insertion of the ball portion 16 into the rounded end portion 42 upon interconnection of the connectors.

The shell 30 is formed by stamping and drawing, either hot or cold, from heavy gauge sheet metal such as steel alloys thereof. It is preferably an integral member, for strength and ease of assembly as well as to provide for a neat and uncluttered coupling.

Within the shell there is provided a transverse shaft 50 extending between the walls 38 which conveniently may be a large bolt or rivet swaged in place. The head of such a rivet is seen at 52 and the swaged end at 54. The shaft 50 mounts a rockable shoe designated generally 56 and best shown in Fig. 7 apart from the connector 14. The shoe 56 is provided with a generally rectangular body portion 58 having a top wall 60, side walls 62 and a front wall 64. The body portion 58 is open bottom and rear. The front wall 64 is intended to engage the lower half of the ball portion 16 of the ball connector 12, and cooperate with the surface 44 in holding the ball connector 12 in engagement with the socket connector 14 and hence for this purpose the outer surface of the wall 64 is spherical throughout its engaging portion.

The shoe 56 is provided with integral half-journals 66 spaced apart and extending from the rear of the body 58 and upward, opening to their bottoms. Thus, the half-journals may be assembled to the shaft 50 by the simple expedient of hooking them over the shaft while holding the shoe vertically, and then swinging the shoe up into the shell 30. Each half-journal 66 has a central strengthening rib 68 which is preferably eccentric relative to the axes of the half-journals so that they may bear against the lower surface of the top wall 40 of the shell 30 to limit upward swinging movement of the shoe 56.

The top wall 60 of the shoe has a large opening 70 and an elongate member 72 heretofore termed a connecting rod or link passes through this opening 70. Its purpose is to raise or permit lowering of the shoe. That portion extending downward below the top wall 60 has its end threaded as at 74 and mounts a nut 76, a washer 78, and a relatively heavy coil spring 80 in the order named. When the ball and socket connectors are in coupled condition, as for example in Figs. 1, 2 and 3, the connecting link 72 is pulled upward until the spherical face of the wall 64 engages the lower half of the left hand side of the ball portion 16 of the ball connector 12. The spring 80 is slightly compressed in accomplishing this, so that the engagement is tight and resilient, the spring tending to absorb shocks and yet hold the ball portion 16 firmly while permitting limited universal movement thereof. While in this position, the washer 78 is up inside the body 58 between the walls 62. It is chosen of a larger diameter than the distance between walls so that opposite edges may be turned up to provide ears 82 which prevent rotation of the washer 78 relative the shoe 56. With the ears 82 provided, the distance between the ears is less than the maximum diameter of the nut 76 thereby preventing rotation of the nut and thus locking the assembly together so that vibration cannot shake the nut loose. Conveniently the nut may be jammed or the end of the threaded portion 74 peened as an additional safety factor.

The upper portion of the connecting link 72 is flattened as at 86 and extends out the top wall 40 a substantial distance, through a slotted opening 88 in the said top wall. Obviously rotative movement thereof is prohibited thereby. The free end is rounded at 90, the radius of the rounded end 90 being the axis of the central pin 92 for a purpose to be described. A radially inward notch 94 forms a tooth-like formation at the rear of the rounded end 90 (the left hand side in the drawings). A lever 100 is pivotally mounted on the pin 92, the ends of which may be suitably swaged for preventing axial withdrawal thereof. The lever 100 is best illustrated in perspective in Fig. 8 and it is conveniently formed of a single member of sheet metal folded upon itself, but with the two sides spaced apart and separated by a web. This formation is merely a matter of choice, however, the lever being capable of formation in any desired way.

The lever 100 has side walls 102 spaced apart and connected by a top web 104 which terminates rearwardly in a large handle portion 106. The lever 100 has two flattened edges formed on each of the side walls connected by an arcuate portion or nose. These three surfaces serve as cam means to raise and lower the connecting link. Looking at Fig. 8, the dwell portion 108 is horizontal, the dwell portion 110 is generally vertical, and the connecting arcuate nose portion 112 is intermediate. There is a bearing plate 114 on the top of the shell having an opening 116 aligned with the opening 88.

The plane of the surfaces 108 is at a greater distance from the pivot pin 92 than the plane of the surfaces 110. Therefore, when the surfaces 108 are engaged against the bearing plate 114, the connecting link 72 is raised its fullest extent, the flattened portion being secured to the pin 92, between walls 102. When, however, the surfaces 110 are engaged against the bearing plate 114, the connecting link 72 is lowered, to the position shown in Fig. 4. Both conditions are achieved by grasping the handle 106 and rotating the lever 100 over the rounded corners 112 to one or the other of the described positions. The relatively weak coil spring 120 between the top wall 60 and the inner surfaces of the upper wall 40 of the shell 30 urges the shoe to its downward position when the connecting link 72 is in lower position. This facilitates insertion of the ball portion 16 into the shell 30.

It can be conceived that the rounded portion 42 and the front wall 64 of the shoe 56 are the equivalent of a pair of jaws, moving vertically one relative the other in grasping a coupler member, and this language will also be used in the claims to describe the elements of the invention.

From the structure described above, it will be seen that through the simple expedient of rotating the lever 100 approximately 90° either clockwise or counter-clockwise one may lift or lower the shoe 56 to engage or disengage the ball connector 12. These functions are accomplished through a minimum of structural parts and moving elements. Furthermore, the movement is positive, and the engagement in position shown in Fig. 3 is firm and resilient.

In order to lock the coupling 10 in the engaged condition, a novel latch is provided. The web 104 is slotted as at 122 and a short latch member 124 is pivotally mounted at 126 between the walls 102, with its free end protruding into the slot 122. At the pin 92, the walls 102 are struck inwardly in forming circular bearings 128 which enable the spacing between walls 102 to be greater than the thickness of the flattened portion 86. A bilateral spiral spring 130 the halves of which are connected by loop 132 engaged in notch 134 urges the latch member to rotate clockwise. The free ends 136 of the spring 130 are engaged between the respective walls 102 and opposite sides of flattened upper portion 86 of link 72, bearing against formations 128. The latch member 124 has a laterally extending projection 138 which is urged into engagement with the rounded end 90. The configuration of projection 138 is such as to engage notch 94 when the latter is suitably positioned.

Consider Fig. 4 where the shoe 56 is down, that is, pivoted out of the shell 30. The lever 100 has been rotated to a generally vertical position and there is sufficient clearance to insert the ball portion 16 in the socket connector 14. Note that the spring 130 urges the projection 138 against the rounded end 90. Once the ball portion 16 is inserted, it is desired to raise the connecting link 72. The handle 106 is grasped and the lever rotated counter-clockwise. Dwell edge 110 is rocked onto nose 112 lifting the link 72. In the meantime projection 138 rides the rounded end 90. When dwell edge 108 engages the bearing plate 114, the projection 138 reaches the notch 94 and spring 130 snaps the projection into engagement with said notch automatically locking the link 72 in its raised position. Since attempted rotation of lever 100 in a clockwise direction from the position in Fig. 3 applies a force on notch 94 which is radially inward relative to pin 92, the projection is just forced against said notch and the movement is effectively blocked.

The only way to enable lowering of the link 72 is to pull the latch member 124 in a counter-clockwise direction about its pivot 126 against the bias of the spring 130 to withdraw projection 138 from notch 94. This accomplished, the lever 100 may be rotated. Only one finger need be used to pull latch member 124 to the left as viewed in the drawings, and hence the operator can unlock latch and lower the link 72 with one hand in one continuing movement.

A pair of aligned slots 140 are provided one in each wall 102 to accommodate the shackle of a padlock 142. The location of the shackle would be in the path of unlocking movement of latch member 124 so that the projection 138 cannot be removed, and the coupling 10 not unlocked and separated by unauthorized personnel.

It is believed that this invention, its mode of construction and assembly, and many of its advantages should be readily understood from the foregoing without further description, and it should also be manifest that while a preferred embodiment of the invention has been shown and described for illustrative purposes, the specific details are nevertheless capable of wide variation within the purview of this invention as defined in the appended claims.

What is claimed and desired to be secured by Letters Patent of the United States is:

1. A trailer coupling comprising, a ball-end connector and a socket-end connector of generally elongate and channel-like formation having a pair of jaws of which one is pivotal relative to the other for clamping and release of the ball-end connector, a vertically reciprocable rod connected to move said pivotal jaw and having one end thereof protruding through an opening in the connecting web of the socket-end connector, a channel-shaped lever having a top web and side walls straddling and pivotally connected to the protruding end of the rod for rotation in a vertical plane and having cam means cooperating with the upper surface of said connecting web for raising and lowering the rod upon pivotal movement of the lever for effecting respectively the clamping and release positions of the jaws, and an automatic latching mechanism for locking said rod and lever against inadvertent movement one relative to the other when the jaws are in clamping position comprising a spring-biased latch member mounted between the side walls of the lever of the socket-end connector and movable simultaneously with movement of the lever and relatively to said protruding end to achieve latching engagement between the rod and lever under normal bias of the spring only when the rod has been raised to effect the clamping position of the jaws, the rod being in its raised position when the lever is generally parallel with the socket-end connector and extends toward the rear thereof and the rod being in its lower position when said lever extends generally at right angles to the socket-end connector, the connecting web of the lever having a slot therein, said latch member being spaced to the rear of said rod and having a free end thereof protruding upwardly through said slot when said lever is in said horizontal position, said lever terminating in a handle disposed within sufficient proximity of the free end of the latch member to enable manual movement of said free end releasing said latching engagement against said bias in a movement away from the rod and the lever with one hand of the operator.

2. A trailer coupling comprising, a ball-end connector and a socket-end connector of generally elongate and channel-like formation having a pair of jaws of which one is pivotal relative to the other for clamping and release of the ball-end connector, a vertically reciprocable rod connected to move said pivotal jaw and having one end thereof protruding through an opening in the connecting web of the socket-end connector, a channel-shaped lever having a top web and side walls straddling and pivotally connected to the protruding end of the rod for rotation in a vertical plane and having cam means cooperating with the upper surface of said connecting web for raising and lowering the rod upon pivotal movement of the lever for effecting respectively the clamping and release positions of the jaws, and an automatic latching mechanism for locking said rod and lever against inadvertent movement one relative to the other when the jaws are in clamping position comprising a spring-biased latch member mounted between the side walls of the lever of the socket-end connector and movable simultaneously with movement of the lever and relatively to said protruding end to achieve latching engagement between the rod and lever under normal bias of the spring only when the rod has been raised to effect the clamping position of the jaws, the rod being in its raised position when the lever is generally parallel with the socket end connector and extends toward the rear thereof and the rod being in its lower position when said lever extends generally at right angles to the socket-end connector, the connecting web of the lever having a slot therein, said latch member being spaced to the rear of said rod and having a free end thereof protruding upwardly through said slot when said lever is in said horizontal position, said lever terminating in a handle disposed within sufficient proximity of the free end of the latch member to enable the lever end to be grasped in one hand with a finger of said hand engaging the free end of the latch whereby the lever may be raised simultaneously with movement of the free end of the latch member by the finger in a direction away from the rod member to release said latching engagement.

3. A trailer coupling comprising, a ball-end connector; and a socket-end connector, comprising a generally elongate channel-like member formed with a socket at the end thereof and a mating socket jaw member pivoted thereto operable to open and close about said ball end to couple the same thereto; a vertically reciprocable rod yieldably connected at one end to said pivoted jaw member and having its other end protruding through an opening in the web of said channel member; an operating lever for opening and closing said jaw member of said socket-end connector about the ball-end connector, said operating lever comprising a channel member having two side walls and a connecting web portion, said lever being pivotally connected to said protruding end of the rod, the edges of said walls having an eccentric cam formation adapted to contact the top of said channel-like member when the lever is swung to draw said rod to jaw-closing position, said cam passing from one side of the vertical line, drawn through said pivot, to the other side of said line to hold said jaw in stable socket-closing position; a latch member disposed between said side walls at said one side of said vertical line, provided with a finger piece protruding through an opening in said connecting web portion of the operating lever; and yielding means automatically urging said latch member in a substantially horizontal direction into operative position to hold said operating lever locked against accidental pivotal movement from its operative jaw closing position; said operating lever being formed with a handle adjacent said latch protrusion, whereby the latch may be released by a substantially horizontal movement of a finger of the same hand of the operator grasping the handle preceding a substantially vertical movement of the handle releasing the socket from the ball connector.

4. A trailer coupling as defined in claim 3, in which said latch member is pivotally mounted between said side walls of the operating lever, said latch member being formed with a shoulder, there being an engagement surface formed on said protruding rod portion for engagement by said shoulder to positively prevent pivotal movement of the operating lever, when disposed in jaw-closing position.

5. A trailer coupling as defined in claim 4, in which said cam portion comprises a flat dwell portion disposed at the greatest distance from said pivotal connection in a plane substantially parallel to said handle, said flat dwell portion extending on both sides of the vertical through said pivotal connection when the lever is disposed in jaw-closing position, said latch member being pivotally mounted between said side walls adjacent to said dwell portion closest to said handle.

References Cited in the file of this patent

UNITED STATES PATENTS

| | | |
|---|---|---|
| 2,170,980 | Thorp et al. | Aug. 29, 1939 |
| 2,178,094 | Berleuti | Oct. 31, 1939 |
| 2,426,532 | Tierney | Aug. 26, 1947 |
| 2,523,500 | Davey et al. | Sept. 26, 1950 |